United States Patent Office 3,283,749
Patented Nov. 8, 1966

3,283,749
METHOD OF STARTING INTERNAL COMBUSTION ENGINE FOR PRODUCTION OF SYNTHETIC GASES
Kosai Hiratsuka, Hiroshi Tsuji, and Toshiharu Ota, Kudamatsu, Japan, assignors to Hitachi Limited, Tokyo, Japan, a corporation of Japan
No Drawing. Filed Oct. 27, 1964, Ser. No. 406,892
1 Claim. (Cl. 123—1)

This invention relates to a method of starting internal combustion engines for the production of raw material gases for the synthesis of ammonia and methanol by incomplete combustion of hydrocarbons with oxygen.

In the process of producing synthetic raw gases by incomplete combustion of a mixture of hydrocarbons and oxygen in an internal combustion engine a slightly lower flow rate of oxygen than the reasonable mixture ratio of hydrocarbon and oxygen causes a misfire and reduces the yield of effective components in the exhaust gas. On the other hand, a slight increase of flow rate of oxygen than said reasonable ratio results in a substantially complete combustion so that the calorific value is increased so rapidly as to raise the temperature of combustion gases, and to increase explosion pressure and output, which are liable to damage the engine. Therefore, the ratio of the flow rate of hydrocarbon and oxygen must always be regulated to maintain reasonable value.

Internal combustion engines are, however, generally started by applying an external force for a short period using a starting electric motor, compressed air, etc., hence it is very difficult to regulate the mixture ratio of hydrocarbon and oxygen to a reasonable value during a short interval of starting the internal combustion engine. Besides, even if the mixture ratio of hydrocarbons and oxygen should be kept at a reasonable value, as soon as the mixture of said gases is ignited and the engine enter into self-running condition, the revolving speed of the engine is changed suddenly, thereby changing said mixture ratio so that no stable starting can be expected.

The method of the invention to start internal combustion engines for the production of synthetic raw material gases by incomplete combustion of hydrocarbons with oxygen is characterized in that the internal combustion engine is started by the use of a mixture of hydrocarbons and brought into operation with the rated output and thereafter changed-over to operation by the use of a mixture of hydrocarbons and oxygen by gradually increasing the flow rates of hydrocarbons and oxygen while gradually reducing the flow rate of air to maintain substantially constant calorific value per unit volume and substantially constant rate of feeding gases.

The principal object of the invention is to facilitate safe and easy starting of internal combustion engines to be operated by the use of hydrocarbons and oxygen.

In case of complete combustion of hydrocarbons with air in an internal combustion engine, a stable operation of the internal combustion engine can be maintained for a broad range of surplus air rate of 0.7–1.5, and if a certain flow rate of air is given the calorific value will never exceed that calorific value which is generated by complete combustion of the gas mixture containing hydrocarbons in the theoretical proportion with the given flow rate of air and hence the output of the engine will never exceed certain value of horse powers.

Accordingly, in case of almost complete combustion of hydrocarbons with air in the internal combustion engine, since a stable operation of the internal combustion engine can be maintained for a broad range of the mixture ratio, starting of the internal combustion engine can be done very easily by the use of hydrocarbons and air.

When a natural gas is used as said hydrocarbon, the calorific value per unit volume can be made the same with that calorific value per unit volume of a mixed gas which is generated by the complete combustion of said natural gas with air by choosing a suitable mixture ratio of said natural gas, oxygen and air.

The combustion of a natural gas containing 90% of methane with air the quantity of which is in the theoretical mixture ratio with that of the natural gas generates a calorific value of 8,000 Kcal. per 1 Nm.$^3$ of the mixed gas. Calculations show that following combinations of flow rates of natural gas ($CH_4=90\%$, inert gases=10%), oxygen ($O_2=90\%$, $N_2=10\%$) and air produce gas mixtures having the calorific value substantially equivalent to 8,000 Kcal. per 1 Nm.$^3$ of each mixed gas.

[Ratio of flow rates (percent by volume) for producing gas mixtures having calorific value of 8,000 Kcal./Nm.$^3$]

| Natural gas | Oxygen | Air |
|---|---|---|
| 10.5 | 0 | 89.5 |
| 15.2 | 4.2 | 80.6 |
| 21.1 | 9.2 | 69.7 |
| 28.5 | 15.5 | 56.0 |
| 36.2 | 22.2 | 41.6 |
| 43.9 | 28.9 | 27.2 |
| 50.9 | 34.8 | 14.3 |
| 58.6 | 41.4 | 0 |

If the net efficiency as an internal combustion engine is assumed to be 27%, the work done per 1 Nm.$^3$ of said gas mixture will be 0.34 PSH. The results of measurement carried out on an internal combustion engine having eight cylinders by using a natural gas containing 94% of methane and oxygen of 96% purity are shown below as an example.

*Example*

| Flow rate of a gas mixture (Nm.$^3$/h.) | 317 | 264 | 262 | 193 |
|---|---|---|---|---|
| Ratio of flow rates (percent by volume): | | | | |
| Natural gas | 10.5 | 33.2 | 41.3 | 53.2 |
| Oxygen | 0 | 22.2 | 31.1 | 46.8 |
| Air | 89.5 | 44.6 | 27.6 | 0 |
| Horse powers generated (PS) | 103 | 95 | 96 | 67.5 |
| Horse powers generated/Quantity of gas supplied (PSH/Nm.$^3$) | 0.352 | 0.360 | 0.366 | 0.350 |

It is apparent from the above example that the change-over from a gas mixture of a natural gas and air to a gas mixture of a natural gas and oxygen can be made by gradually increasing flow rates of a natural gas and oxygen while reducing the flow rate of air to maintain approximately constant calorific value per unit volume of the gas mixture supplied. If the calorific value per unit volume of the gas mixture is kept at substantially a constant level, the rate of combustion is also maintained at substantially a constant value, hence the possibility of causing back-fire during the change-over operation is eliminated.

Besides, as the temperature of the gas mixture during combustion is kept at substantially a constant level there will be no possibility of an extra heavy thermal load being applied on the internal combustion engine. The generated horsepower is also kept approximately constant by maintaining constant rate of suction gas supply; i.e., the volume of the gas charge per unit time is kept constant regardless of the ratio of air to oxygen. Thus it can be done easily to start the engine by the use of a gas mixture of a natural gas and air to change-over thereafter into operation by the use of a mixture of the natural gas and oxygen.

It is now apparent from the foregoing detailed description that safety and easy starting of the internal combustion engine for the production of synthetic gases can be done by starting it at first by the use of a mitxure of hydrocarbon gas and air and bringing it to operation with the rated output and thereafter changing-over to operation by the use of a mixture of hydrocarbon gas and oxygen by gradually increasing the flow rate of hydrocarbon and oxygen while reducing the flow rate of air.

What we claim is:

A method of starting internal combustion engines for the production of synthetic raw material gases by incomplete combustion of hydrocarbons with oxygen, which comprises starting the engine by the use of a mixture of hydrocarbons and air, bringing the engine to operation with the rated output, and changing-over thereafter to operation by the use of a mixture of hydrocarbons and oxygen by gradually increasing flow rates of hydrocarbons and oxygen while reducing the flow rate of air to maintain substantially constant calorific value per unit volume and substantially constant rate of suction gas supply.

References Cited by the Examiner

UNITED STATES PATENTS

| | | | |
|---|---|---|---|
| 1,183,038 | 5/1916 | Schlaepfer | 123—1 |
| 2,518,082 | 8/1950 | Shively | 123—124 X |
| 2,578,475 | 12/1951 | Hirsch | 123—1 X |
| 2,605,175 | 7/1952 | Barber | 123—120 X |
| 2,655,788 | 10/1953 | Sedille | 60—39.46 |
| 2,948,112 | 8/1960 | Smith | 60—35.6 X |

CARLTON R. CROYLE, *Primary Examiner.*

R. D. BLAKESLEE, *Assistant Examiner.*